(12) United States Patent
Mears

(10) Patent No.: US 10,662,803 B2
(45) Date of Patent: May 26, 2020

(54) AEROFOIL BODY

(71) Applicant: ROLLS-ROYCE PLC, London (GB)

(72) Inventor: Matthew Mears, Nottingham (GB)

(73) Assignee: ROLLS-ROYCE plc, London (GB)

( * ) Notice: Subject to any disclaimer, the term of this patent is extended or adjusted under 35 U.S.C. 154(b) by 440 days.

(21) Appl. No.: 15/458,154

(22) Filed: Mar. 14, 2017

(65) Prior Publication Data

US 2017/0298758 A1    Oct. 19, 2017

(30) Foreign Application Priority Data

Apr. 13, 2016  (GB) .................................. 1606324.0

(51) Int. Cl.
  *F01D 9/04* (2006.01)
  *F04D 29/32* (2006.01)
  (Continued)

(52) U.S. Cl.
  CPC ........... *F01D 17/162* (2013.01); *F01D 9/041* (2013.01); *F01D 25/005* (2013.01); *F03G 7/065* (2013.01);
  (Continued)

(58) Field of Classification Search
  CPC ......... F05D 2300/505; F05D 2300/603; F01D 5/148; F01D 17/14; F01D 9/04;
  (Continued)

(56) References Cited

U.S. PATENT DOCUMENTS 3,042,371 A * 7/1962 Fanti ..................... F04D 29/368
                                                           244/219
3,589,835 A * 6/1971 Linden .................... B64C 27/32
                                                           416/103
(Continued)

FOREIGN PATENT DOCUMENTS

EP             1681439 A1      7/2006

OTHER PUBLICATIONS

Aug. 22, 2017 Search Report issued in European Patent Application No. 17160711.
(Continued)

*Primary Examiner* — Dwayne J White
*Assistant Examiner* — Wesley Le Fisher
(74) *Attorney, Agent, or Firm* — Oliff PLC

(57) ABSTRACT

An aerofoil body for a gas turbine engine is provided. The aerofoil body has leading and trailing edge portions, wherein one of the leading and trailing edge portions is a morphable edge portion having a composite layer structure. The aerofoil body further has a non-morphing central portion which forms pressure and suction surfaces of the aerofoil body between the leading and trailing edge portions. The composite layer structure includes a return spring, one or more shape memory alloy layers, and a flexible cover for the return spring and the one or more shape memory alloy layers. The flexible cover defines pressure and suction surfaces of the aerofoil body at the morphable edge portion. The one or more shape memory alloy layers are electrically (Continued)

heatable to deform the layers against the resistance of the return spring, and thereby alter the pitch of the aerofoil body at the morphable edge portion.

9 Claims, 3 Drawing Sheets

(51) Int. Cl.
*F01D 17/16* (2006.01)
*F01D 25/00* (2006.01)
*F03G 7/06* (2006.01)

(52) U.S. Cl.
CPC ........ *F04D 29/323* (2013.01); *F05D 2220/36* (2013.01); *F05D 2240/121* (2013.01); *F05D 2240/122* (2013.01); *F05D 2270/62* (2013.01); *F05D 2300/505* (2013.01); *F05D 2300/603* (2013.01)

(58) Field of Classification Search
CPC ........ F01D 9/041; F04D 29/247; F04D 29/26; F04D 29/388; F04D 29/382; F04D 29/36; B64C 2027/7288; Y02T 50/14
See application file for complete search history.

(56) References Cited

U.S. PATENT DOCUMENTS

| | | | |
|---|---|---|---|
| 5,114,104 A | 5/1992 | Cincotta et al. | |
| 5,186,420 A | 2/1993 | Beauchamp et al. | |
| 6,182,929 B1* | 2/2001 | Martin | B63B 1/248 244/219 |
| 8,899,528 B2* | 12/2014 | Coconnier | B64C 7/00 244/130 |
| 2002/0012587 A1* | 1/2002 | Farrar | F01D 5/28 415/220 |
| 2002/0153729 A1* | 10/2002 | Beauchamp | F01D 5/148 290/55 |
| 2006/0018761 A1 | 1/2006 | Webster et al. | |
| 2006/0140772 A1* | 6/2006 | McMillan | F01D 5/147 416/241 R |
| 2007/0110583 A1 | 5/2007 | McMillan | |
| 2009/0269198 A1* | 10/2009 | Grohmann | B64C 27/615 416/23 |
| 2010/0018212 A1* | 1/2010 | Core | B64D 33/06 60/771 |
| 2010/0329851 A1* | 12/2010 | Nilsson | F01D 5/148 415/151 |
| 2011/0217170 A1* | 9/2011 | Buffone | B64C 3/48 416/128 |
| 2013/0302168 A1 | 11/2013 | Kray et al. | |
| 2015/0285157 A1* | 10/2015 | Burdick | F02C 3/04 60/805 |

OTHER PUBLICATIONS

Jul. 13, 2016 Search Report issued in Great Britain Patent Application No. GB1606324.0.

\* cited by examiner

AEROFOIL BODY

The project leading to this application has received funding from the Clean Sky 2 Joint Undertaking under the European Union's Horizon 2020 research and innovation programme under Grant agreement No CS2-ENG-GAM-2014-2015-01

FIELD OF THE INVENTION

The present invention relates to an aerofoil body for a gas turbine engine having a morphable leading and/or trailing edge portion.

BACKGROUND

Fan outlet guide vanes (OGVs) within high bypass turbofan engines are multifunctional components, which de-swirl the flow, provide noise suppression, and act as one of the main core mounting structures. For a fixed pitch turbofan engine the bypass flow cold nozzle is usually choked at high power and cruise operation conditions. This ensures the resulting swirl angle from the vanes remains within manageable limits throughout the flight envelope.

On a fixed pitch engine, the OGVs are profiled to accommodate a small range of swirl angles exiting the fan, and to efficiently redirect the flow such that when the air exists the engine its direction is parallel to the engine axis.

However, the introduction of a variable pitch fan generates a greater range of swirl angles exiting the fan, due to the fan operating under a range of pitch angles. Moreover, a variable pitch fan also allows a reverse flow regime to be established in the bypass flow for the purposes of generating reverse thrust. In reverse flow, static OGVs which are designed to work most efficiently in cruise can induce significant swirl into the flow, increasing core inlet distortion.

Accordingly, variable OGVs have been proposed. For example, a mechanism can be provided to rotate the outlet guide vanes around the radial direction. However, such a mechanism can detract from ability of the OGVs to perform as structural mounting components.

SUMMARY

It would be desirable to provide an aerofoil body that can address these issues.

Thus in a first aspect, the present invention provides an aerofoil body for a gas turbine engine, the aerofoil body having:
leading and trailing edge portions, wherein one of the leading and trailing edge portions is a morphable edge portion having a composite layer structure, and
a non-morphing central portion which forms pressure and suction surfaces of the aerofoil body between the leading and trailing edge portions;
wherein the composite layer structure includes a return spring, one or more shape memory alloy layers, and a flexible cover for the return spring and the one or more shape memory alloy layers, the flexible cover defining pressure and suction surfaces of the aerofoil body at the morphable edge portion, and the one or more shape memory alloy layers being electrically heatable to deform the layers against the resistance of the return spring and thereby alter the pitch of the aerofoil body at the morphable edge portion.

By forming one of the leading and trailing edge portions as a morphable edge portion, the aerofoil can be adapted to accommodate a wider range of varying flow patterns. However, retaining a non-morphing central portion allows the aerofoil body to act as a structural component of the engine. Moreover the composite layer structure can provide failure tolerance, as under control failure of the shape memory alloy layers the morphable edge portion can return to a safe pre-defined configuration determined by the return spring.

In a further aspect, the present invention provides a gas turbine engine having one or more aerofoil bodies according to the first aspect.

Optional features of the invention will now be set out. These are applicable singly or in any combination with any aspect of the invention.

The composite layer structure may be removably attached to the non-morphing central portion. This facilitates maintenance of the aerofoil body, as the morphable edge portion alone can be removed from the body rather than having to remove the whole body from the engine for scheduled or unscheduled maintenance.

The return spring may be a laminate return spring over which the one or more shape memory alloy layers extend. For example, the composite layer structure may include a first shape memory alloy layer on the pressure side thereof and a second shape memory alloy layer on the suction side thereof. Actuation of the first layer can then be used to produce one type of pitch alteration, and actuation of the second layer can be used to produce another type of pitch alteration.

The one or more shape memory alloy layers may be heated by passing electrical current directly through the alloy layers. However, preferably, the composite layer structure further include one or more electrical heating elements which respectively extend over the one or more shape memory alloy layers. For example, the aerofoil body may have plural of the electrical heating elements radially distributed along the morphable edge portion, the radially distributed electrical heating elements being independently controllable to variably deform the one or more shape memory alloy layers against the resistance of the return spring and thereby alter the twist of the aerofoil body at the morphable edge portion. In this case, each shape memory alloy layer may itself be divided into plural portions radially distributed along the morphable edge portion, each shape memory alloy layer portion having a respective electrical heating element.

The shape memory alloy may have a two-way memory effect that remembers a low temperature shape and a high temperature shape.

The other of the leading and trailing edge portions may be another morphable edge portion having a second composite layer structure (i.e. including a return spring, one or more shape memory alloy layers, and a flexible cover for the return spring and the one or more shape memory alloy layers). Optional features of the first composite layer structure may pertain also to the second composite layer structure.

Alternatively, the other of the leading and trailing edge portions may be a non-morphable edge portion, and then typically is also formed as a unitary body with the non-morphing central portion.

The aerofoil body may be a guide vane of a gas turbine engine. For example, it may be an outlet guide vane of the bypass duct of a turbofan engine.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
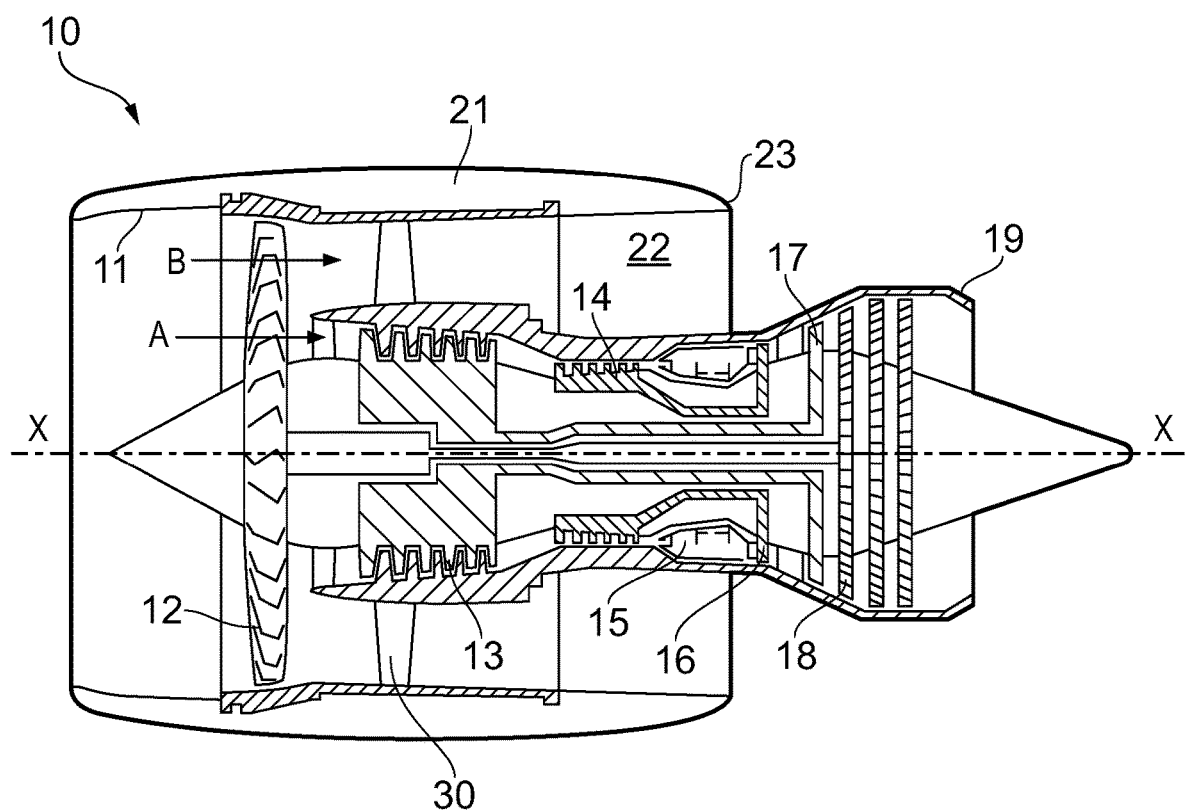
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a variable pitch propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2A:
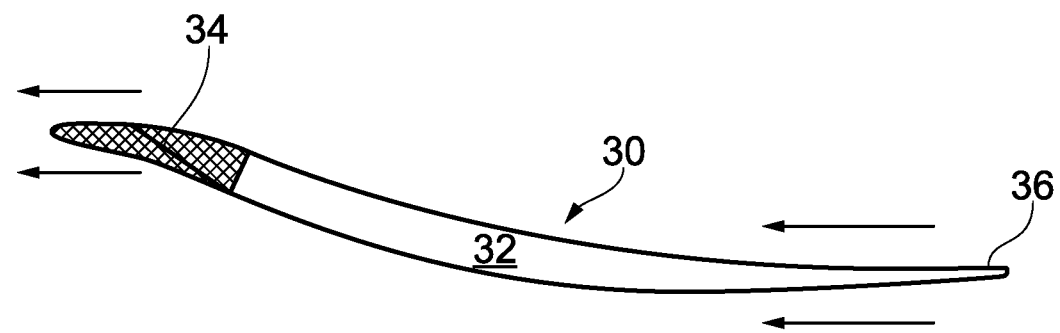
FIGS. 2a-2c show schematically cross-sections through an OGV under operating conditions of: (a) reverse flow, (b) small swirl angle forward flow, and (c) large swirl angle forward flow.
Figure 2B:
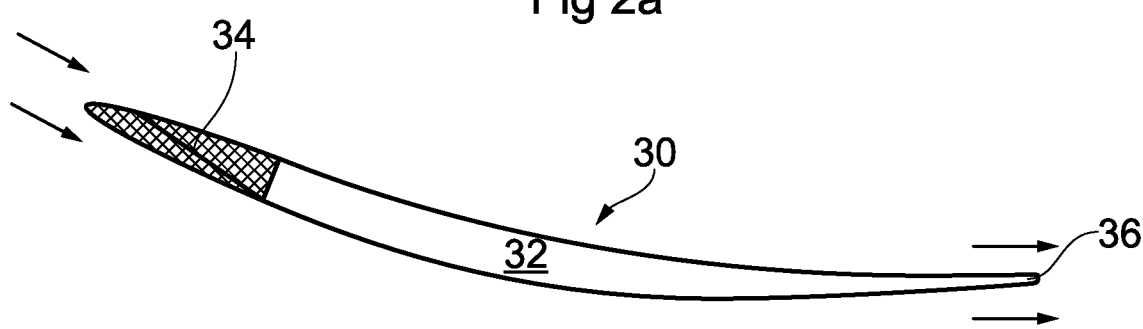
Figure 2C:
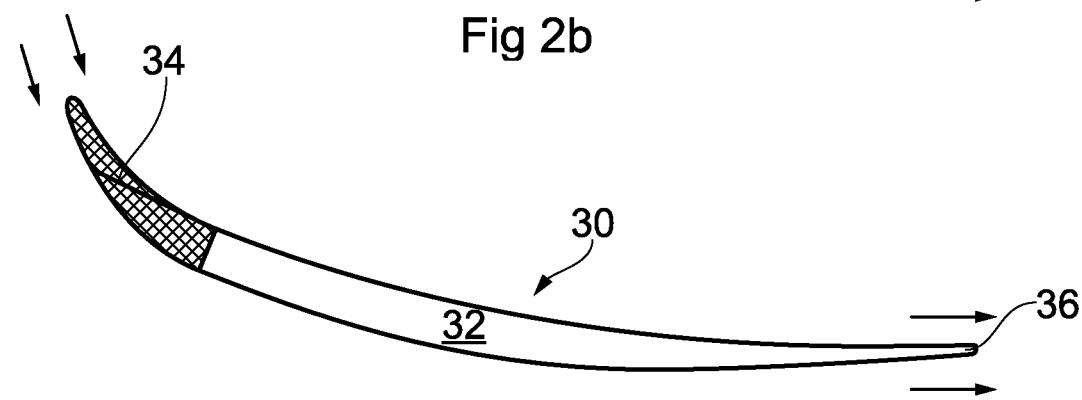

Outlet guide vanes (OGVs) 30 according to the present invention are located in the bypass duct 22 to de-swirl the air flow B. FIGS. 2a-2c show schematically cross-sections through one of the OGVs under operating conditions of: (a) reverse flow, (b) small swirl angle forward flow, and (c) large swirl angle forward flow, the air flow over the OGV being indicated by open-headed arrows. The OGV includes a morphable leading edge portion 34 (indicated by cross-hatching), and a non-morphing central portion 32 which forms pressure and suction surfaces of the OGV between the leading edge portion and a non-morphing trailing edge portion 36. This trailing edge portion is integral and thus formed unitarily with the central portion. The OGV central portion connects at its inner end to the casing of the engine core and at its outer end to the nacelle 21. The OGV thus acts as a structural support member to hold the core in position.

The morphable edge portion 34 can be controlled to change its shape and thus to alter the pitch of the leading edge of the vane relative to the principal axis of the engine. In other words, the morphable edge portion allows the camber of the guide vane to vary. Advantageously, changing the shape and pitch of the OGV 30 at its leading edge allows the edge to be aligned to the changing swirl angle of the bypass flow produced by the variable pitch fan 12 under forward flow (FIGS. 2b and 2c). Thus, the vane can accommodate a larger range of swirl angles than a fixed vane, and the efficiency and performance of the engine can be accordingly improved. Furthermore, under reverse flow conditions (FIG. 2a), the leading edge can be adjusted to align itself more with the axial direction of the bypass duct, reducing the amount of swirl into the fan and reducing core intake distortion.

Figure 3:
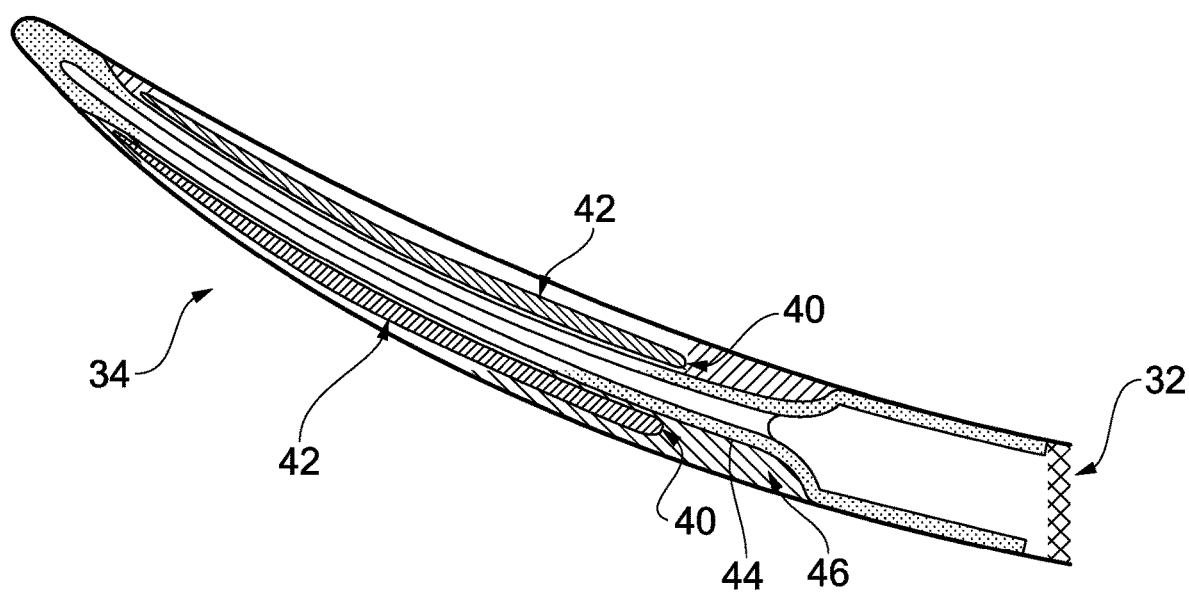
FIG. 3 shows schematically a close-up cross-sectional view of a morphable leading edge portion of the OGV of FIGS. 2a-2c.

FIG. 3 shows schematically a close-up cross-sectional view of the morphable leading edge portion 34 attached to the non-morphing central portion 32 of the OGV 30. The morphable leading edge portion includes a central composite laminar spring 44 which is removably attached at one end to the non-morphing central portion and extends therefrom to the tip of the leading edge. The spring is sandwiched on either side between two strips or ribbons 42 of smart memory alloy (SMA). Each SMA strip has a respective heating element 40 which extends over its surface facing the spring. The spring, SMA strips and heating elements are then wrapped in a flexible, protective cover 46, forming a composite layer structure, the cover blending with the adjacent outer surface the central portion 32 to form smooth and continuous air-washed surfaces.

The morphable leading edge portion 34 has a resting configuration, typically corresponding to small swirl angle forward flow (FIG. 2b). When current flows through the heating elements 40 they heat up the respective SMA strips 42, causing the strips to transform to specific configurations "stored" in molecular memory, i.e. to change shape. As a given strip changes shape, the overall shape of the leading edge portion 34 changes, causing the pitch of the leading edge to alter, and thereby enabling improvement in the aerodynamic performance of the gas turbine engine. On cessation of the current flow, the strip cools, causing the shape change to reverse such that the leading edge portion returns to its resting configuration. The bypass air flow B helps to rapidly cool the strip, reducing the response time for return to the resting configuration.

The spring 44 provides a restoring force biasing the composite layer structure towards the resting configuration. This also helps to reduce the response time for return to the resting configuration. Moreover, if there is control failure of a heating element 40 or a mechanical failure of an SMA strip 42, the spring provides a restoring force which helps to return the OGV to a "safe" default configuration.

Preferably the SMA of the strips 42 has a two-way memory effect that remembers a low temperature shape and a high temperature shape. Heating of one of the strips causes the leading edge to adopt the large swirl angle forward flow configuration (FIG. 2c) against the resistance of the spring 44, and heating of the other of the strips causes the leading edge to adopt the reverse flow configuration (FIG. 2a) against the resistance of the spring. In each case, removal the of heat causes reversion to the small swirl angle forward flow configuration (FIG. 2b).

The adaptive composite layer structure enables reliable and lightweight actuation. Further, the morphable leading edge portion 34 can be detached, if necessary, from the non-morphing central portion 32 for repair or replacement, while the central portion conveniently continues to acts as a structural support member holding the engine core in position.

The pitch of the morphable leading edge portion 34 may also be varied in the radial direction, e.g. allowing the OGV 30 to better match the radial variation in swirl angles produced by the large amounts of twist in modern fan blades. For example, the pitch of the leading edge near the core casing, relative to the engine's axis of rotation, may be smaller than the pitch of the leading edge near the nacelle. To achieve such alteration in the twist of the aerofoil body at the morphable edge portion, the leading edge portion may have plural of the heating elements 40 radially distributed along the morphable edge portion at each side thereof. Selective actuation of the elements can thus produce a desired degree of twist. To enhance the selective actuation, each SMA strip 42 may be divided into plural radially distributed portions, each SMA layer portion having a respective heating element.

While the invention has been described in conjunction with the exemplary embodiments described above, many equivalent modifications and variations will be apparent to those skilled in the art when given this disclosure. For example, instead of the leading edge, the trailing edge of the OGV may be morphable, or both the leading and trading edges may be morphable. Also the invention may be applied to other aerofoil bodies in the engine, such as other guide vanes. Accordingly, the exemplary embodiments of the invention set forth above are considered to be illustrative and not limiting. Various changes to the described embodiments may be made without departing from the spirit and scope of the invention.

The invention claimed is:

1. An aerofoil body for a gas turbine engine, the aerofoil body having:
   leading and trailing edge portions, wherein the leading edge portion is a morphable edge portion having a composite layer structure, and
   a non-morphing central portion which forms pressure and suction surfaces of the aerofoil body between the leading and trailing edge portions;
   wherein the composite layer structure includes a return spring, one or more shape memory alloy layers, and a flexible cover for the return spring and the one or more shape memory alloy layers, the flexible cover defining pressure and suction surfaces of the aerofoil body at the morphable edge portion, and the one or more shape memory alloy layers being electrically heatable to deform the layers against the resistance of the return spring and thereby alter the pitch of the aerofoil body at the morphable edge portion, and
   wherein the return spring extends to a tip of the leading edge portion and the one or more shape memory alloy layers covers only a part of the return spring and stops before reaching the tip of the leading edge portion.

2. The aerofoil body according to claim 1, wherein the composite layer structure is removably attached to the non-morphing central portion.

3. The aerofoil body according to claim 1, wherein the return spring is a laminate return spring over which the one or more shape memory alloy layers extend.

4. The aerofoil body according to claim 3, wherein the composite layer structure includes a first shape memory alloy layer on a pressure side of the spring and a second shape memory alloy layer on a suction side of the spring.

5. The aerofoil body according to claim 1, wherein the composite layer structure further includes one or more electrical heating elements which respectively extend over the one or more shape memory alloy layers.

6. The aerofoil body according to claim 5, having plural of the electrical heating elements radially distributed along the morphable edge portion, the radially distributed electrical heating elements being independently controllable to variably deform the one or more shape memory alloy layers against the resistance of the return spring and thereby alter the twist of the aerofoil body at the morphable edge portion.

7. The aerofoil body according to claim 1, wherein the trailing edge portion is another morphable edge portion having a second composite layer structure.

8. The aerofoil body according to claim 1, wherein the trailing edge portion is a non-morphable edge portion.

9. The aerofoil body according to claim 1 which is a guide vane of a gas turbine engine.

* * * * *